Patented Sept. 10, 1935

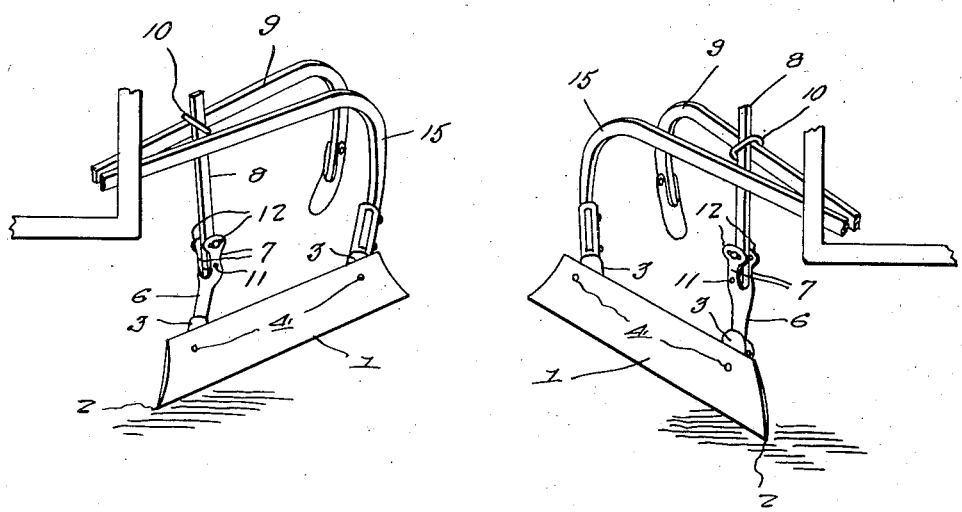
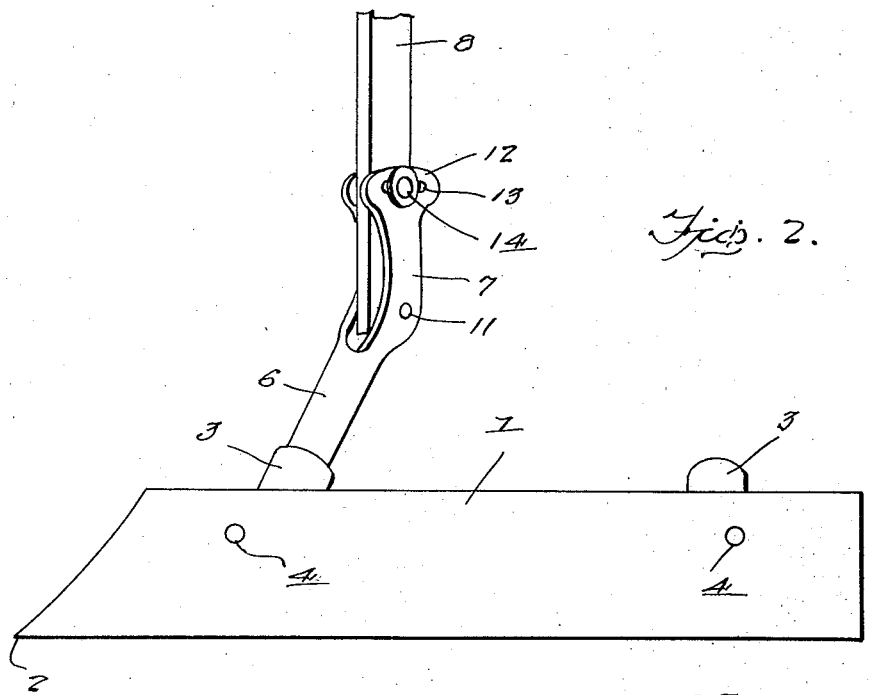

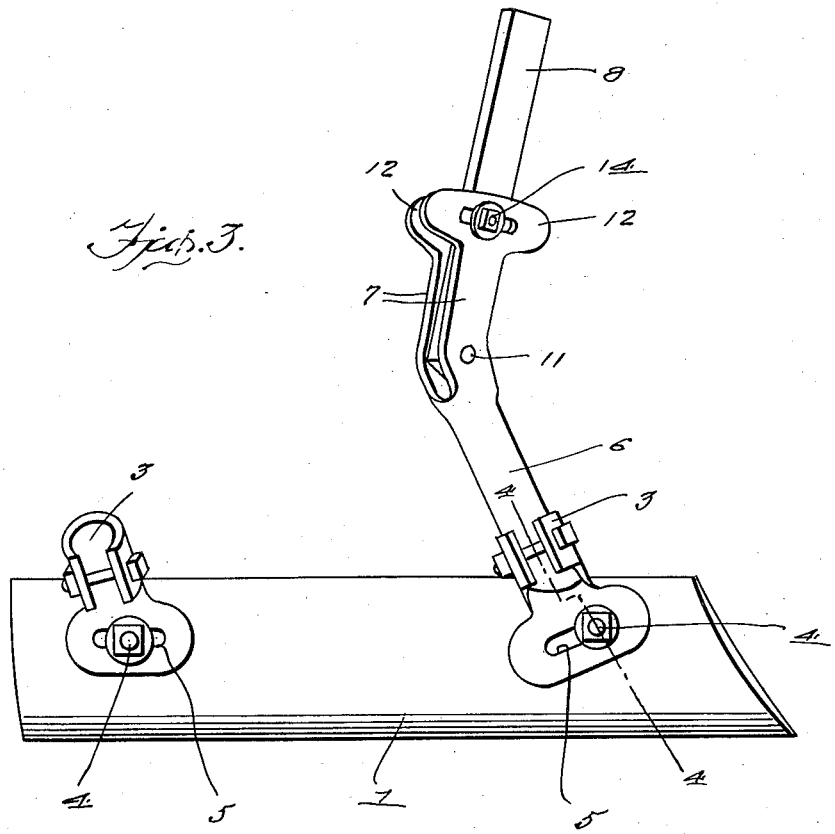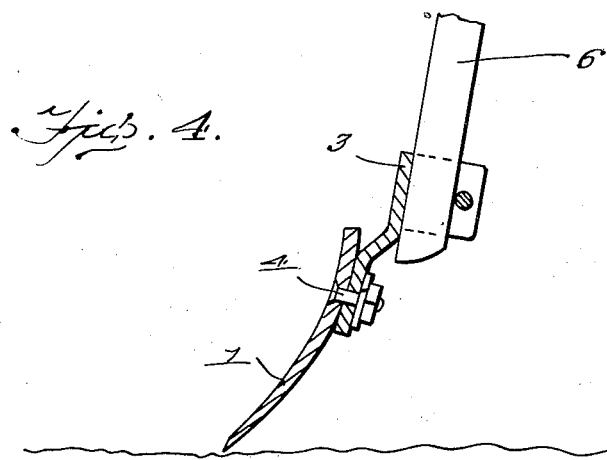

2,014,055

UNITED STATES PATENT OFFICE 2,014,055

CULTIVATOR BLADE

August W. Tempel, Higginsville, and Walter C. Skaggs, Kansas City, Mo.

Application August 14, 1934, Serial No. 739,778

2 Claims. (Cl. 97—206)

The present invention relates to new and useful improvements in cultivator blades and has for one of its important objects to provide, in a manner as hereinafter set forth, a device of this character comprising a novel construction and mounting through the medium of which corn, cotton, beans, potatoes and other crops may be rapidly cultivated without injuring the roots of the plants.

Another important object of the invention is to provide a cultivator blade which treats only the upper portion of the soil, thus preserving moisture in dry weather and substantially preventing or materially reducing soil erosion.

Other objects of the invention are to provide a cultivator blade of the character set forth which will be comparatively simple in construction, strong, durable, highly efficient and reliable in use and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a perspective view, showing a pair of blades in accordance with the present invention mounted on the shanks of a conventional cultivator.

Figure 2 is a view in front elevation of the invention.

Figure 3 is a rear elevational view.

Figure 4 is a sectional view through a forward portion of the invention, taken substantially on the line 4—4 of Figure 3.

Referring now to the drawings in detail, it will be seen that the embodiment of the invention which has been illustrated comprises an elongated, beveled blade 1 of arcuate cross section which terminates in a point 2 at its forward end. As illustrated to advantage in Figure 3 of the drawings, the blade 1 has secured on its rear or convex face and adjacent its ends clamps 3. The clamps 3 are secured to the blade 1 by bolts 4, said clamps being provided with slots 5 which permit adjustment.

The forward clamp 3 is secured to an angular bracket 6 having bifurcations 7 on its upper end which straddle a hanger 8 which is secured to one of the beams 9 of a cultivator in a manner to depend therefrom, as at 10. The bracket 6 is pivotally connected to the lower end of the hanger 8, as at 11. At their upper ends, the bifurcations 7 terminate in heads 12 having slots 13 therein which accommodate a bolt 14 which extends through the hanger 8. It will thus be seen that the bracket 6 is mounted for swinging adjustment on the hanger 8, the bolt 14 constituting means for securing said bracket in adjusted position. The rear clamp 3 is secured to the shank 15 of the cultivator.

It will be noted that the blade 1 is mounted at an inclination on the clamps 3, as illustrated to advantage in Figure 4 of the drawings. In use, a pair of the blades is mounted on the shanks 9 and 15 of a cultivator in a manner to converge rearwardly (see Figure 1). Then, as the cultivator travels over the rows most of the cutting done by the shovels occurs near the middle of said rows, the dirt being moved toward the plants.

It will be understood, of course, that the blades straddle the rows of plants as the cultivator travels thereover. The blades treat only the upper portion of the soil and substantially no cutting is done near the plants. It has been found that by the use of shovels in accordance with the present invention soil erosion is substantially eliminated and moisture is preserved in the soil below the upper portion thereof, resulting in a materially increased yield per acre.

It is believed that the many advantages of a cultivator blade constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

1. In a straddle row cultivator including pairs of shanks, a pair of rearwardly converging, inclined blades of substantially arcuate cross section, clamps adjustably mounted on the rear end portions of the blades and engageable with certain of the shanks, hangers depending from the other shanks, clamps adjustably mounted on the forward end portions of the blades, and bifurcated brackets secured in the second-named clamps and mounted for swinging adjustment on the hangers.

2. In a straddle row cultivator including pairs of shanks, a pair of rearwardly converging, inclined blades of substantially arcuate cross section, clamps adjustably mounted on the rear end portions of the blades and engageable with certain of the shanks, hangers depending from the other shanks, clamps adjustably mounted on the forward end portions of the blades, and brackets secured in the second-named clamps and mounted for swinging adjustment on the hangers, said brackets including bifurcations on their upper ends straddling the hangers and pivotally connected thereto, heads on the free ends of the bifurcations, said heads having slots therein, and bolts mounted in the hangers and engaged in the slots for securing the brackets in adjusted position on said hangers.

AUGUST W. TEMPEL.
WALTER C. SKAGGS.